United States Patent
Homer et al.

(10) Patent No.: US 8,519,857 B2
(45) Date of Patent: Aug. 27, 2013

(54) SYSTEMS AND METHODS OF CONTROLLING A FAN IN AN ELECTRONIC SYSTEM

(75) Inventors: Steven S. Homer, Tomball, TX (US); Jeffrey A. Lev, Tomball, TX (US); Mark H. Ruch, The Woodlands, TX (US); Mark S. Tracy, Tombal, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 311 days.

(21) Appl. No.: 13/058,377

(22) PCT Filed: Sep. 3, 2008

(86) PCT No.: PCT/US2008/075104
§ 371 (c)(1),
(2), (4) Date: Feb. 10, 2011

(87) PCT Pub. No.: WO2010/027355
PCT Pub. Date: Mar. 11, 2010

(65) Prior Publication Data
US 2011/0133944 A1 Jun. 9, 2011

(51) Int. Cl.
*G08B 21/00* (2006.01)
(52) U.S. Cl.
USPC ........... 340/635; 340/657; 340/660; 340/661; 318/268; 318/490; 361/679.01; 361/679.46; 361/688
(58) Field of Classification Search
USPC ................ 340/635, 657–664; 318/268, 592; 361/679.01, 679.46–679.51, 688–697
See application file for complete search history.

(56) References Cited

U.S. PATENT DOCUMENTS

| | | | |
|---|---|---|---|
| 6,448,896 B1 | 9/2002 | Bankus et al. | |
| 6,528,987 B1 | 3/2003 | Blake et al. | |
| 2003/0091441 A1* | 5/2003 | Huang et al. | 417/42 |
| 2003/0209945 A1* | 11/2003 | Hanson | 307/149 |
| 2004/0009074 A1 | 1/2004 | Dodson, III | |
| 2006/0047466 A1 | 3/2006 | White | |
| 2006/0071623 A1* | 4/2006 | Able et al. | 318/268 |
| 2006/0074585 A1 | 4/2006 | Reinberg et al. | |
| 2006/0152901 A1 | 7/2006 | Espinoza-Ibarra et al. | |
| 2006/0256534 A1 | 11/2006 | Garnett et al. | |
| 2006/0265609 A1 | 11/2006 | Fung | |
| 2007/0089446 A1 | 4/2007 | Larson et al. | |
| 2007/0211430 A1 | 9/2007 | Bechtolsheim | |
| 2007/0217920 A1 | 9/2007 | Aoyama | |

FOREIGN PATENT DOCUMENTS

| | | |
|---|---|---|
| CN | 101004180 A | 7/2007 |
| CN | 101074966 A | 11/2007 |

OTHER PUBLICATIONS

International Searching Authority, International Search Report & Written Opinion dated May 19, 2009, pp. 11.

* cited by examiner

*Primary Examiner* — George Bugg
*Assistant Examiner* — Sharmin Akhter

(57) ABSTRACT

Systems and methods of controlling a fan in an electronic system are disclosed. One example method includes obtaining a control setting of the fan and current speed of the fan. The example method further includes determining a fan speed threshold associated with the obtained control setting. The example method further includes comparing the fan speed threshold to the current speed. The example method further includes generating an alert based on the comparison.

14 Claims, 5 Drawing Sheets

SYSTEMS AND METHODS OF CONTROLLING A FAN IN AN ELECTRONIC SYSTEM

BACKGROUND

Electronic systems enclosed within a chassis generate heat, which is typically dissipated by a fan which expels air through vents in the chassis. If the amount of heat dissipation is reduced, for example, due to failure of a fan or blockage of a vent, damage to the electronic components in the system can occur.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure.

DETAILED DESCRIPTION

Figure 1:
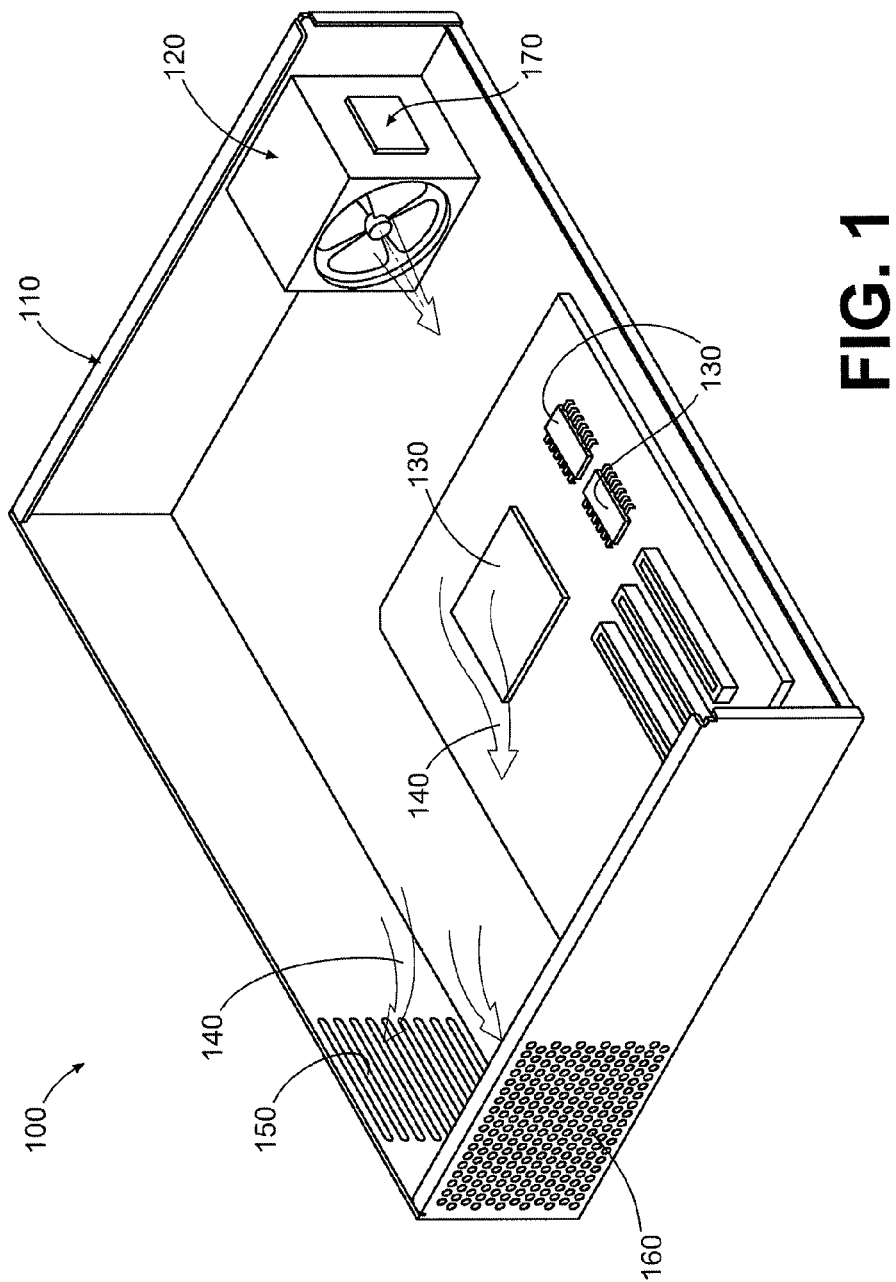
FIG. 1 is a perspective pictorial diagram of an electronic system in accordance with one embodiment of systems and methods of controlling a fan as disclosed herein.

FIG. 1 is a perspective pictorial diagram of an electronic system. Electronic system 100 includes a chassis 110, fan 120, and one or more electronic components 130. Fan 120 is contained within chassis 110 and disposed to generate airflow along path 140, so that air flows through fan 120, over the components 130, and out one or more slots 150 or apertures 160. Thus, heat accumulated in components 130 is dissipated.

The design of a particular electronic system 100 produces a certain amount of resistance to airflow (called backpressure or impedance), as a result of the placement of components 130, slots 150 and apertures 160 within chassis 110. Fan 120 must overcome this backpressure in order to move air through electronic system 100. The backpressure increases when dust and dirt collect within electronic system 100, or when electronic system 100 is placed in a location that blocks air from entering or exiting slots 150 and apertures 160 (e.g., placed close to a wall). An increase in backpressure means fan 120 moves less air at the same speed, or (stated another way) must spin faster to move the same amount of air.

Electronic system 100 also includes fan monitor logic 170, which monitors for an increase in backpressure and generates an alert if the backpressure reaches a threshold. (Although logic 170 resides on fan 120 in FIG. 1, this is for illustration purposes only, and logic 170 may be physically located anywhere within system 100.) Fan monitor logic 170 does not measure backpressure directly, but indirectly determines backpressure using the current state of fan 120 in combination with a priori knowledge about the characteristics of electronic system 100, and particular about the expected airflow through electronic system 100.

Figure 2:
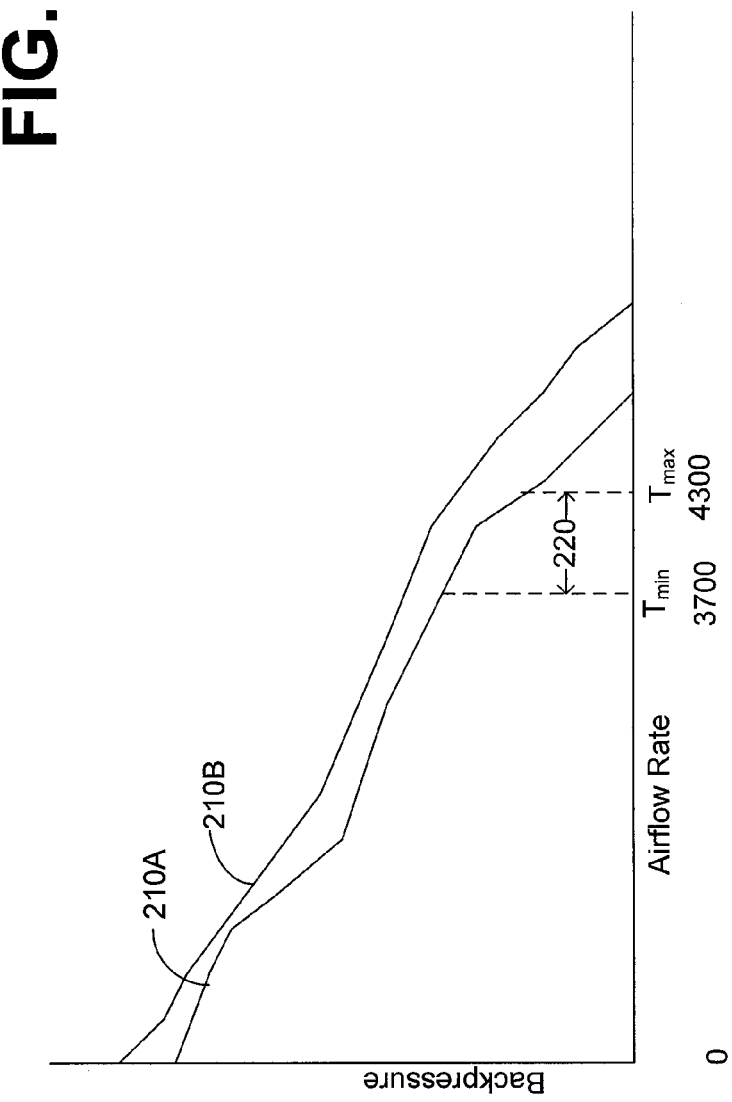
FIG. 2 is a graph describing airflow characteristics of the electronic system from FIG. 1.

FIG. 2 is a graph describing airflow characteristics of electronic system 100. The horizontal axis represents airflow rate (cubic feet per minute), while the vertical axis represents backpressure within electronic system 100. A fan curve 210 for a particular input voltage plots the airflow produced by the fan at different backpressures. The maximum airflow is produced when backpressure is zero (right side of the curve), and airflow is reduced as backpressure increases, with airflow of zero at some amount of backpressure (left side of curve). Fan curve 210A describes the behavior of a particular fan at 4.2 Volts and fan curve 210б describes the behavior of the same fan at 4.8 Volts.

Target airflow region 220 indicates the range of airflow through electronic system 100 that is appropriate for the cooling needs of electronic system 100. Typically, system designers calculate the appropriate range of airflow based on the heat produced by electronic system 100. Furthermore, because fan airflow can be calculated from fan speed, target airflow region 220 can also be defined in terms of fan speed, $T_{min}$ to $T_{max}$, rather than in terms of airflow. In the example shown in FIG. 2, target airflow region 220A is between 3700 and 4300 (for a 4.2V input to the fan).

An airflow less than that produced at fan speed $T_{min}$ may indicate that system backpressure is higher than desirable, or that the fan itself is wearing out, either of which leads to an increase of temperature and increased probability of component failure. Thus, fan monitor logic 170 detects when fan speed is below $T_{min}$ and generates an alert.

Some embodiments of fan monitor logic 170 store fan speed thresholds $T_{min}$ and/or $T_{max}$ in a table or other data structure. As described above, each fan speed threshold is associated with a fan control input value (e.g., voltage). In some embodiments, multiple tables are used, one for each fan control input value (e.g., a 3.5V table, a 4.0V table, a 4.2V table, a 5.0V table, etc.). In other embodiments, fan speed threshold values for multiple fan control input values are all stored in the same table, with specific portions of the table being associated with each fan control input value (e.g., first entry indicates threshold for 3.5V, second entry indicates threshold for 4.0V, etc.). A person of ordinary skill in the art should appreciate that fan speed thresholds can be stored in any form of non-volatile storage, including secondary storage mechanisms such as hard disk, etc.

The fan speed threshold table can be populated in various ways. In some embodiments of electronic system 100, a specific make/model of an electronic system 100 is tested (e.g., after manufacturing) to determine appropriate fan speed thresholds for the cooling needs of electronic system 100, then each instance of that make/model is populated with these threshold values. That is, the thresholds are specific to a product, but not to an individual system.

In other embodiments, the fan speed threshold table is populated with values that are customized for a particular instance of a system. In some of these embodiments, these customized values are learned by monitoring the system's behavior to produce a history. For example, a system's cooling can be presumed to be at peak efficiency upon shipment from the factory, so fan monitor logic 170 might record fan speed at various voltages during the first N boot cycles, or for the first M hours of operation. The threshold could be determined as the average of the recorded fan speeds, and the table populated with the calculated thresholds.

Some existing electronic systems use a different kind of fan speed table, one which relates temperature trigger points to fan speed: if temperature reaches a specified threshold the fan speed is increased to the value specified in the table. In some embodiments of electronic system 100, the fan speed thresholds $T_{min}$ and/or $T_{max}$ used by fan monitor logic 170 are also stored in the fan speed-temperature table.

Figure 3:
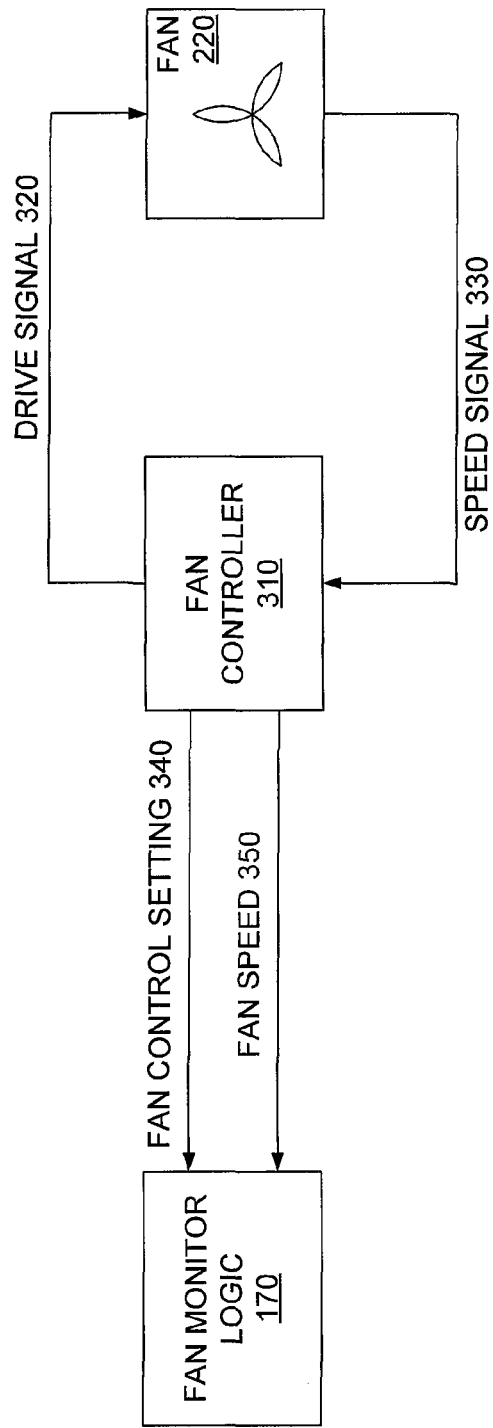
FIG. 3 is a block diagram which includes the fan and the fan monitor logic from FIG. 1.

FIG. 3 is a block diagram which includes fan 120 and fan monitor logic 170 from FIG. 1. Fan controller 310 controls the speed of fan 120 through a drive signal 320 output provided to fan 120. In some embodiments, drive signal 320 is a variable DC voltage. In other embodiments, DC voltage is supplied separately to fan 120, and the DC voltage is modulated by a pulse width modulated drive signal 320. Fan controller 310 utilizes a feedback loop in which a fan speed signal 330 is used to adjust drive signal 320.

Fan 120 thus has a configurable fan control setting 340 which controls the fan speed 350. Fan monitor logic 170 obtains the current fan control setting 340 and the current fan speed 350 from fan controller 310. In some embodiments, fan control setting 340 and/or fan speed 350 are digital values provided through registers within fan controller 310. In some of these embodiments, fan monitor logic 170 performs a translation on the digital values of fan control setting 340 and/or fan speed 350. For example, some fan controllers use an 8-bit register for controlling fan speed, with a zero value signifying 0V (fan off) and a value of 0xFF signifying a maximum voltage such as 5.0V. In such cases, fan monitor logic 170 may translate from 0xFF to 5. As another example, some fan controllers provide a register which reports the number of clock cycles in a single rotation. In such cases, fan monitor logic 170 may calculate the speed (e.g., revolutions per minute) by multiplying the reported number of clock cycles by 60× clock frequency.

Fan monitor logic 170 compares the current fan speed 350 to an expected range that is associated with the current fan control setting 340. If the fan speed goes out of range, fan monitor logic 170 generates alert 360. In some embodiments, alert 360 takes the form of an interrupt to the host processor residing in electronic system 100.

Figure 4:
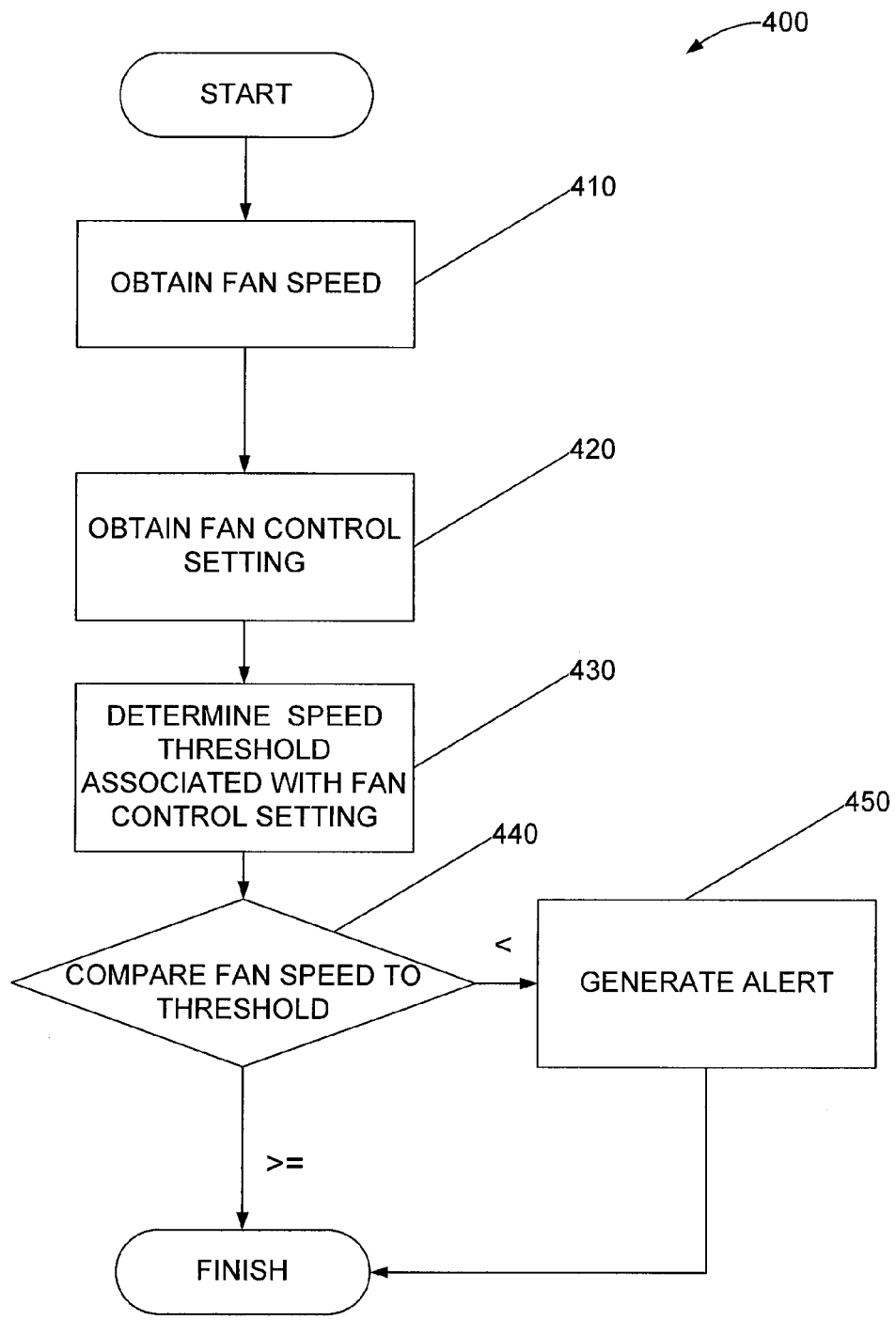
FIG. 4 is a flowchart illustrating operation of one embodiment of the fan monitor logic from FIG. 1.

FIG. 4 is a flowchart illustrating operation of one embodiment of fan monitor logic 170. Process 400 begins at block 410, where fan monitor logic 170 obtains the current value of fan speed 350. At block 420, fan monitor logic 170 obtains the current value of fan control setting 340. In another variation of process 400 (not shown), fan monitor logic 170 sets the fan control to a maximum value (e.g., maximum voltage, minimum pulse width, etc.) at block 420 instead of obtaining the current fan control value. This variation specifically tests the fan speed at maximum input, rather than testing fan speed using whatever the fan input happens to be.

At block 430, fan monitor logic 170 determines the fan speed threshold associated with the current fan control setting 340 (e.g., by looking up the threshold in a table associated with the fan control setting 340 or with a translated fan control setting 340). At block 440, fan monitor logic 170 compares fan speed 350 (obtained at block 410) to the threshold (obtained at block 430). Fan monitor logic 170 then generates an alert based on the comparison: if fan speed 350 meets or exceeds the threshold, process 400 is complete; if fan speed 350 is under the threshold, an alert is generated at block 450, and process 400 is complete.

Process 400 may be implemented in a standalone program (e.g., a diagnostic utility) or as part of the basic input/output system (BIOS) of electronic system 100. Process 400 may be executed periodically (e.g., from a timer tick, at a scheduled time, etc.), at power-up, or at reset.

Figure 5:
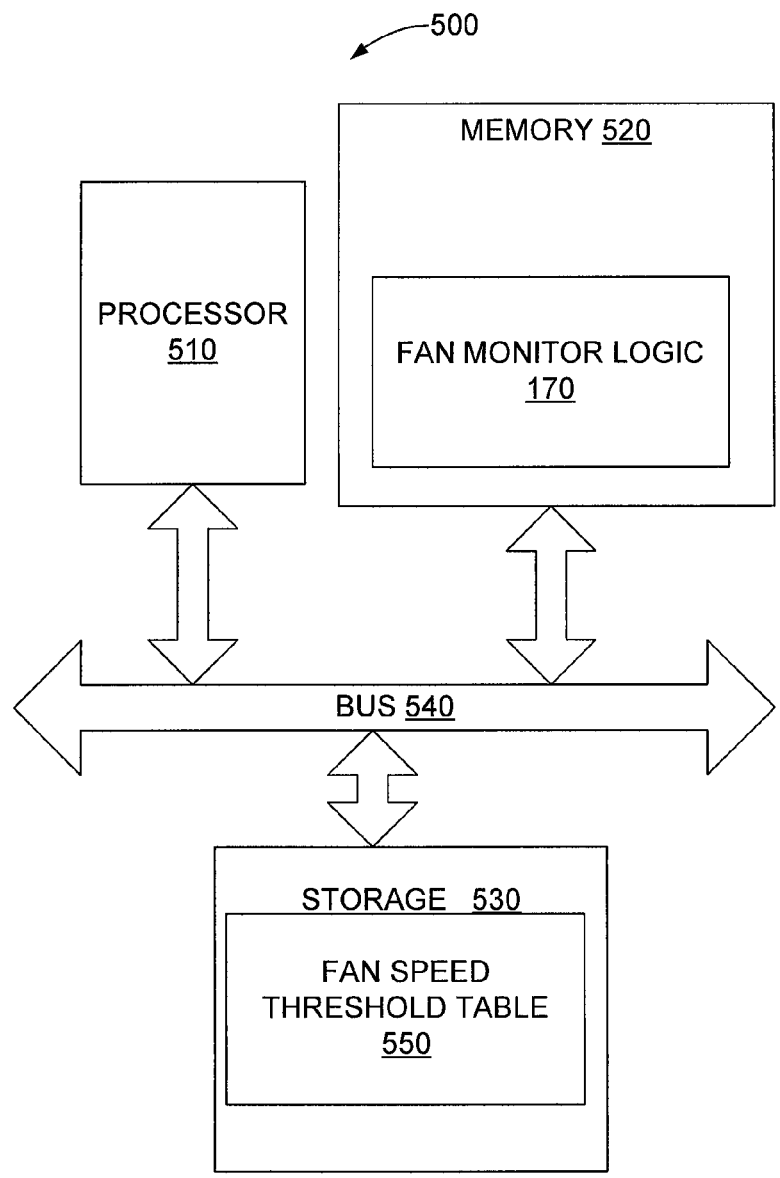
FIG. 5 is a hardware block diagram of the electronic system from FIG. 1.

FIG. 5 is a hardware block diagram of an electronic system 100. Electronic system 100 includes a processor 510, memory 520, fan monitor logic 170 and non-volatile storage 530. These components are coupled via bus 540. In this example embodiment, a fan speed threshold table 550 (described earlier in connection with FIGS. 3 and 4) is stored in storage 530. Examples of non-volatile storage include, for example, a hard disk, flash RAM, flash ROM, EEPROM, etc. Omitted from FIG. 5 are a number of conventional components, known to those skilled in the art, which are not necessary to explain the operation of electronic system 100.

Fan monitor logic 170 can be implemented in software, hardware, or a combination thereof. In some embodiments, logic 170 is implemented in software that is stored in memory 520 and that is executed by processor 510. In other embodiments, logic 170 is implemented in hardware, including, but not limited to, a programmable logic device (PLD), programmable gate array (PGA), field programmable gate array (FPGA), an application-specific integrated circuit (ASIC), a system on chip (SoC), and a system in package (SiP).

Logic 170 can be embodied in any computer-readable medium for use by or in connection with an instruction execution system, apparatus, or device. In the context of this disclosure, a "computer-readable medium" can be any means that can store the program for use by, or in connection with, the instruction execution system. The computer readable medium can be, for example but not limited to, based on electronic, magnetic, optical, electromagnetic, or semiconductor technology. Specific examples of a computer-readable medium using electronic technology would include (but are not limited to) the following: random access memory (RAM); a read-only memory (ROM); an erasable programmable read-only memory (EPROM or Flash memory). A specific example using magnetic technology includes (but is not limited to) a portable computer diskette. Specific examples using optical technology include (but are not limited to) compact disk read-only memory (CD-ROM).

The flow charts herein provide examples of the operation of fan monitor logic 170 according to an embodiment of the present disclosure. Alternatively, these diagrams may be viewed as depicting actions of an example of a method implemented in fan monitor logic 170. Blocks in these diagrams represent procedures, functions, modules, or portions of code which include one or more executable instructions for implementing logical functions or steps in the process. Alternate implementations are also included within the scope of the disclosure. In these alternate implementations, functions may be executed out of order from that shown or discussed, including substantially concurrently or in reverse order, depending on the functionality involved.

The software components illustrated herein are abstractions chosen to illustrate how functionality is partitioned among components in some embodiments of a system and method for anti-aliasing a procedural texture. Other divisions of functionality are also possible, and these other possibilities are intended to be within the scope of this disclosure. Furthermore, to the extent that software components are described in terms of specific data structures (e.g., arrays, lists, flags, pointers, collections, etc.), other data structures providing similar functionality can be used instead. As just one example, a particular implementation might use a linked list instead of an array.

The foregoing description has been presented for purposes of illustration and description. It is not intended to be exhaustive or to limit the disclosure to the precise forms disclosed. Obvious modifications or variations are possible in light of the above teachings. The implementations discussed, however, were chosen and described to illustrate the principles of the disclosure and its practical application to thereby enable one of ordinary skill in the art to utilize the disclosure in various implementations and with various modifications as are suited to the particular use contemplated. All such modifications and variation are within the scope of the disclosure as determined by the appended claims when interpreted in accordance with the breadth to which they are fairly and legally entitled.

What is claimed is:

1. A method of providing an alert associated with a fan in an electronic system, the method comprising:
   obtaining a control setting of the fan and current speed of the fan;
   determining a fan speed threshold associated with the obtained control setting, including obtaining the fan speed threshold from a table populated with a plurality of fan speed thresholds chosen based on fan speeds recorded at a plurality of voltages for a predetermined duration;
   comparing the fan speed threshold to the current speed; and
   generating an alert based on the comparison.

2. The method of claim 1, wherein the determining further comprises:
   determining which of a plurality of fan speed thresholds, each associated with a corresponding one of a plurality of fan control settings, is associated with the obtained control setting.

3. The method of claim 1, further comprising storing a plurality of fan speed thresholds, each associated with one of a plurality of fan control settings, wherein the determining further comprises:
   determining which of the plurality of fan speed thresholds is associated with the obtained control setting.

4. The method of claim 1, further comprising determining the plurality of fan speed thresholds based on operation of the fan.

5. The method of claim 1, further comprising:
   monitoring fan speed at a plurality of fan control settings;
   based on the monitoring, determining a plurality of fan speed thresholds, each associated with a corresponding one of the plurality of fan control settings; and
   storing the plurality of fan control settings,
   wherein the determining the fan speed threshold further comprises:
   determining which of the plurality of fan speed thresholds is associated with the obtained control setting.

6. The method of claim 1, wherein the generating further comprises:
   notifying a user of the electronic system about the fan speed threshold condition.

7. The method of claim 1, wherein the generating further comprises:
   logging an error message which reports the fan speed threshold condition.

8. An electronic device comprising:
   memory storing program code; and
   a processor programmed by the program code to:
   obtain a control setting for a fan associated with the electronic device;
   obtain a current speed of the fan;
   determine a fan speed threshold associated with the obtained control setting;
   compare the fan speed threshold to the current speed; and
   generate an alert based on the comparison,
   the fan speed threshold obtained from a table populated with a plurality of fan speed thresholds chosen based on fan speeds recorded at a plurality of voltages for a predetermined duration.

9. The electronic device of claim 8, wherein the control setting further comprises a voltage control setting.

10. The electronic device of claim 8, wherein the control setting further comprises a pulse width modulation (PWM) duty cycle setting.

11. The electronic device of claim 8, further comprising non-volatile storage, wherein the processor is further programmed by the program code to:
    monitor fan speed at a plurality of fan control settings;
    based on the monitoring, determining a plurality of fan speed thresholds, each associated with a corresponding one of the plurality of fan control settings;
    store the plurality of fan control settings in the non-volatile storage; and
    determine which of the plurality of fan speed thresholds is associated with the obtained control setting.

12. A method of monitoring a fan in an electronic system, the method comprising:
    obtaining a configurable control setting of the fan and a current speed of the fan;
    obtaining, from a table, a fan speed threshold associated with the obtained configurable control setting;
    comparing the fan speed threshold to the current speed;
    generating an alert based on the comparison;
    recording fan speed at a plurality of voltages for a predetermined duration;
    choosing a plurality of fan speed thresholds based on the recorded fan speeds; and
    populating the table with a plurality of fan speed thresholds.

13. The method of claim 12, further comprising:
    populating the table with a plurality of fan speed thresholds.

14. The method of claim 12, further comprising:
    determining which of a plurality of fan speed thresholds, each associated with a corresponding one of a plurality of fan control settings, is associated with the obtained configurable control setting.

* * * * *